(12) United States Patent
Leonhardt et al.

(10) Patent No.: US 10,520,251 B2
(45) Date of Patent: Dec. 31, 2019

(54) UV LIGHT CURING SYSTEMS, AND METHODS OF DESIGNING AND OPERATING THE SAME

(71) Applicant: Heraeus Noblelight America LLC, Gaithersburg, MD (US)

(72) Inventors: Darrin Leonhardt, Gaithersburg, MD (US); William Curtis Harper, Middletown, MD (US)

(73) Assignee: Heraeus Noblelight America LLC, Gaithersburg, MD (US)

( * ) Notice: Subject to any disclaimer, the term of this patent is extended or adjusted under 35 U.S.C. 154(b) by 1024 days.

(21) Appl. No.: 14/994,747

(22) Filed: Jan. 13, 2016

(65) Prior Publication Data
US 2016/0209113 A1    Jul. 21, 2016

Related U.S. Application Data

(60) Provisional application No. 62/103,947, filed on Jan. 15, 2015.

(51) Int. Cl.
| | | |
|---|---|---|
| *F26B 3/28* | (2006.01) | |
| *B05D 3/06* | (2006.01) | |
| *F26B 13/00* | (2006.01) | |
| *G02B 27/09* | (2006.01) | |
| *G02B 27/00* | (2006.01) | |

(Continued)

(52) U.S. Cl.
CPC .............. *F26B 3/28* (2013.01); *B05D 3/061* (2013.01); *F26B 13/002* (2013.01); *G02B 27/0012* (2013.01); *G02B 27/0983* (2013.01); *B29C 35/10* (2013.01); *B29C 2035/0827* (2013.01); *G02B 19/0095* (2013.01)

(58) Field of Classification Search
CPC .. B05D 3/061; B05D 7/20; B29C 2035/0827; B29C 35/10; F26B 13/002; F26B 3/28; G02B 19/0095; G02B 27/0012; G02B 5/0891; F26D 13/00; C03C 25/6226
See application file for complete search history.

(56) References Cited

U.S. PATENT DOCUMENTS 4,710,638 A * 12/1987 Wood ..................... F26B 3/28
                                                                250/492.1
5,298,759 A *  3/1994 Brewer ................ B01J 19/121
                                                                118/722

(Continued)

FOREIGN PATENT DOCUMENTS

JP         S55152567         11/1980

OTHER PUBLICATIONS

International Search Report for International Patent Application No. PCT/US2016/013396, dated Jul. 4, 2016.

*Primary Examiner* — Wyatt A Stoffa
(74) *Attorney, Agent, or Firm* — Stradley Ronon Stevens & Young, LLP (57) ABSTRACT

A UV light curing system is provided. The UV light curing system includes: a UV light source; a primary reflector for reflecting light emitted by the UV light source in a direction of an enclosure, the enclosure at least partially surrounding an object of interest; and a secondary reflector on an opposite side of the enclosure with respect to the primary reflector, the secondary reflector being positioned along a portion of a length of the enclosure, the secondary reflector surrounding at least 40% of the enclosure at the portion of the length of the enclosure.

16 Claims, 6 Drawing Sheets

(51) Int. Cl.
*G02B 19/00* (2006.01)
*B29C 35/10* (2006.01)
*B29C 35/08* (2006.01)

(56) References Cited

U.S. PATENT DOCUMENTS

| | | | | |
|---|---|---|---|---|
| 6,345,149 | B1 * | 2/2002 | Ervin | B01J 19/123 |
| | | | | 118/641 |
| 6,419,743 | B1 * | 7/2002 | Stowe | B05C 3/12 |
| | | | | 118/405 |
| 6,419,749 | B1 * | 7/2002 | Rhoades | B05D 3/067 |
| | | | | 118/620 |
| 6,559,460 | B1 * | 5/2003 | Keogh | H01J 65/044 |
| | | | | 250/492.1 |
| 6,614,028 | B1 * | 9/2003 | Cekic | A61L 2/0011 |
| | | | | 250/432 R |
| 6,626,561 | B2 * | 9/2003 | Carter | F26B 3/28 |
| | | | | 250/455.11 |
| 7,291,846 | B2 * | 11/2007 | Cekic | A61L 2/0011 |
| | | | | 250/432 R |
| 7,923,706 | B2 * | 4/2011 | Brassell | B29C 71/04 |
| | | | | 250/504 R |
| 8,314,408 | B2 * | 11/2012 | Hartsuiker | C03C 25/12 |
| | | | | 250/491.1 |
| 8,872,137 | B2 | 10/2014 | Childers | |
| 9,067,241 | B2 * | 6/2015 | Hartsuiker | C03C 25/12 |
| 9,370,046 | B2 * | 6/2016 | Childers | F26B 3/28 |
| 9,999,696 | B2 * | 6/2018 | Blechschmidt | A61L 2/10 |
| 2002/0012252 | A1 * | 1/2002 | Carter | F26B 3/28 |
| | | | | 362/558 |
| 2002/0050575 | A1 | 5/2002 | Keogh et al. | |
| 2002/0078888 | A1 * | 6/2002 | Overton | B29C 35/10 |
| | | | | 118/620 |
| 2006/0266955 | A1 * | 11/2006 | Arvin | B05D 3/067 |
| | | | | 250/492.1 |
| 2010/0084574 | A1 * | 4/2010 | Brassell | B29C 71/04 |
| | | | | 250/492.1 |
| 2010/0183821 | A1 * | 7/2010 | Hartsuiker | C03C 25/12 |
| | | | | 427/513 |
| 2011/0147356 | A1 | 6/2011 | Leonhardt et al. | |
| 2012/0003398 | A1 * | 1/2012 | Kaszuba | B05D 3/067 |
| | | | | 427/595 |
| 2013/0068969 | A1 * | 3/2013 | Childers | C03C 25/12 |
| | | | | 250/492.1 |
| 2014/0014857 | A1 | 1/2014 | Martinez et al. | |
| 2014/0131755 | A1 | 5/2014 | Owen et al. | |
| 2015/0028020 | A1 * | 1/2015 | Childers | F26B 3/28 |
| | | | | 219/553 |
| 2015/0108370 | A1 * | 4/2015 | Gunter | B05D 3/06 |
| | | | | 250/492.1 |
| 2015/0246148 | A1 * | 9/2015 | Blechschmidt | A61L 2/10 |
| | | | | 422/4 |

* cited by examiner

UV LIGHT CURING SYSTEMS, AND METHODS OF DESIGNING AND OPERATING THE SAME

CROSS-REFERENCE TO RELATED APPLICATION

This application claims the benefit of U.S. Provisional Patent Application No. 62/103,947, filed Jan. 15, 2015, the content of which is incorporated herein by reference.

FIELD

The invention relates to the UV curing systems, and more particularly, to UV curing systems having improved reflectors, and methods of designing such UV curing systems.

BACKGROUND

Ultraviolet light curing (referred to herein as UV curing and UV light curing) is well known in the art, for example, as described in U.S. Pat. No. 4,710,638 (titled "Apparatus for Treating Coatings"), U.S. Pat. No. 8,872,137 (titled "Dual Elliptical Reflector with a Co-Located Foci for Curing Optical Fibers"), and U.S. Patent Application Publication No. 2011/0147356 (titled "UV LED Based Lamp for Compact UV Curing Lamp Assemblies").

In certain conventional UV curing applications (e.g., using dual ellipse geometry based systems, and other conventional UV curing systems, etc.), much of the UV energy provided by the UV energy source for curing (e.g., through photopolymerization) actually misses the target.

Thus, it would be desirable to provide improved UV curing systems and methods of designing such UV curing systems.

SUMMARY

According to an exemplary embodiment of the invention, a UV light curing system is provided. The UV light curing system includes: a UV light source; a primary reflector for reflecting light emitted by the UV light source in a direction of an enclosure, the enclosure at least partially surrounding an object of interest; and a secondary reflector on an opposite side of the enclosure with respect to the primary reflector, the secondary reflector being positioned along a portion of a length of the enclosure, the secondary reflector surrounding at least 40% of the enclosure at the portion of the length of the enclosure.

According to another exemplary embodiment of the invention, a UV light curing system is provided. The UV light curing system includes: a UV light source; a primary reflector for reflecting light emitted by the UV light source in a direction of a target; a secondary reflector on an opposite side of the target with respect to the primary reflector; and at least one tertiary reflector positioned between the primary reflector and the target, the tertiary reflector reflecting light from the secondary reflector back toward the target.

According to another exemplary embodiment of the invention, a method of method of designing a UV curing system is provided. The method includes the steps of: designing a primary reflector to provide a desired irradiance (e.g., a maximum or predetermined level of irradiance, at a predetermined beam width) of light at a predetermined target location for a given UV light producing source size and distribution; and designing a secondary reflector, configured to reflect light from the primary reflector, to provide an increase in the total irradiation at the predetermined target location.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

As used herein, the term "compound curve" is intended to be broadly defined according to its conventional definition, and applies to a curve defined by a reflective surface (i.e., the optical surface) of a reflector, such as a primary reflector, a secondary reflector, and/or a tertiary reflector. The curve of such a reflective surface desirably includes a plurality of elliptical or circular arcs of differing radius length.

UV curing systems according to the invention have particular application in connection with certain narrow target UV curing applications. Examples of such narrow target UV curing applications include optical fiber cladding, optical fiber coloring, cable coloring, wire coloring, etc.

Certain embodiments of the invention use a compound curve to define the reflective/optical surfaces of one or more reflector(s) such as the secondary reflector (sometimes referred to as a back reflector). Such compound curves may be included in the design of the reflector(s) to significantly increase the optical irradiance at the narrow target.

According to certain embodiments of the disclosure, using a small UV LED light source (e.g., individual LEDs), an optical system entendue (light collection and usage efficiency) can be greatly improved to provide much higher peak powers at the various surfaces of a narrow target. Further, by increasing the light usage efficiency at the target, lower input electrical power is used to achieve the same curing results, thereby lowering energy consumption. Further still, higher peak irradiance can be achieved at the target, providing benefits such as increased process speed, enabling less photoinitiator (which tends to be the most expensive component) content in the formulation, reducing cost, and reducing volatile formation during the process, which tends to contaminate and limit process run times.

Embodiments of the invention relate to UV curing systems (and related methods of design) wherein non-simple elliptical reflective surfaces (e.g., compound curves) may be used to optimize the peak power (irradiance) at the target. The invention may involve the use of optical system simulations in connection with the UV curing system design (including the design of the optical elements of the UV curing system), to provide improved/optimized design parameters (such as improved/maximum peak intensity at the target).

More specifically, full scale optical simulations which accurately portray the UV light source (such as UV LED light source) emission characteristics, materials indices of refraction, and surface reflection properties, may be employed for the design of the UV curing systems. Such optical simulations allow for the incorporation of compound curve shaped reflective surfaces, or other complex reflective/optical surfaces of the reflector(s). In such simulations, the optical design may be optimized to maximize the irradiance at the target (e.g., a 1-2 mm wide area where an optical fiber is drawn). By optimizing the reflector design (e.g., of the primary reflector, the secondary reflector, and/or the tertiary reflectors, etc.), improved processing speeds and improved UV energy efficiency may be achieved while using existing capital equipment.

By improving the peak irradiance for a narrow target (e.g., optical fiber), additional benefits (besides improved processing speed and UV energy efficiency) are provided. For example, the direct costs of manufacturing the target (e.g., the coated optical fiber) is reduced. Further, the small light source size (e.g., small LEDs) allows for improved photon collection and re-direction to the narrow target, as compared to larger optical sources (e.g., microwave lamp bulbs) or LED sources with a relatively large space between the LEDs.

Figure 1:
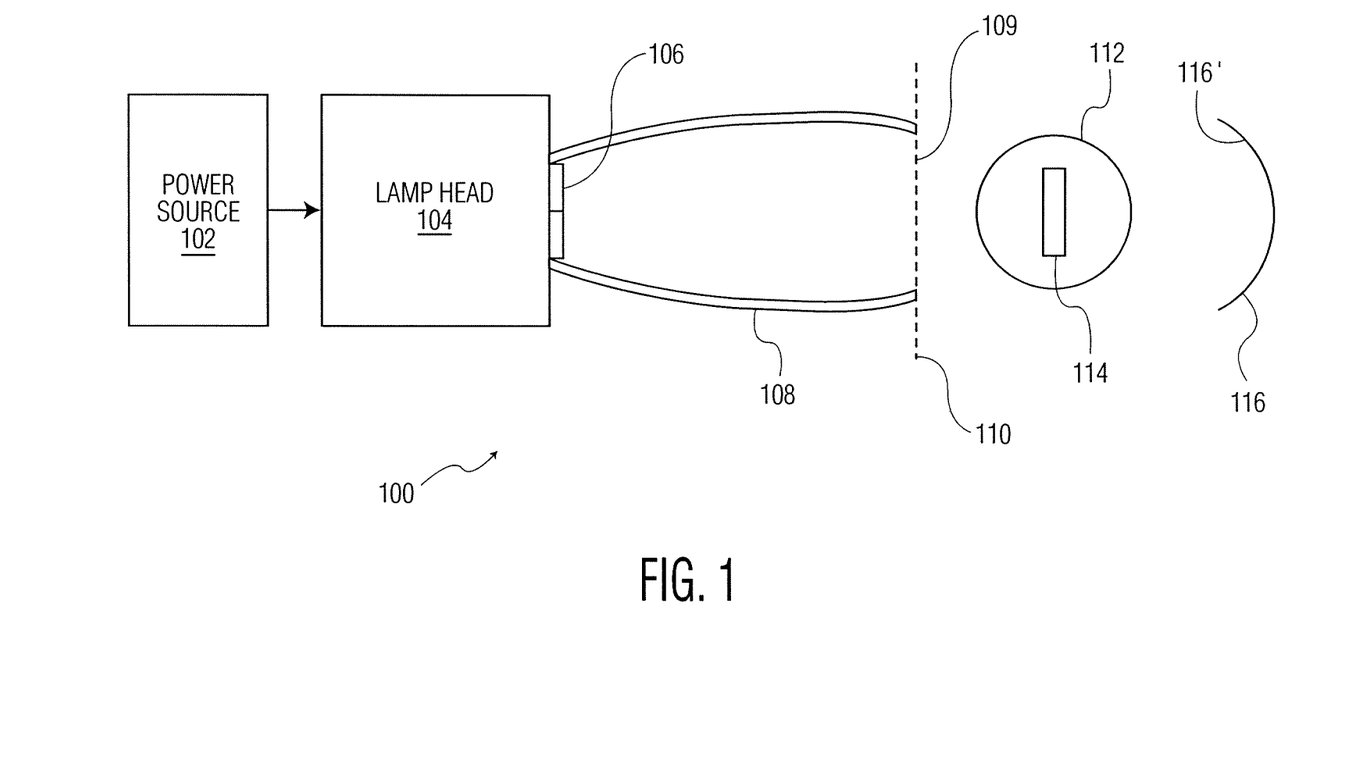
FIG. 1 is a block diagram of a UV light curing system in accordance with an exemplary embodiment of the invention.

Referring now to the drawings, FIG. 1 illustrates an ultraviolet (UV) light curing system 100. UV light curing system 100 includes a power source 102 (e.g., a power supply) configured to provide electrical power to a lamp head 104 (e.g., a UV light source, sometimes referred to herein as a UV light producing source). Lamp head 104 includes light producing elements 106 (e.g., UV LEDs). Additional details of lamp head 104 are omitted for simplicity.

A primary reflector 108 is coupled to lamp head 104, and includes an opening 109 through which light emitted by light producing elements 106 (at target window 110) is reflected by primary reflector 108, and is directed toward an enclosure 112.

A target 114 (e.g., an object of interest to be irradiated using light from lamp head 104, such as an optical fiber, a ribbon, a pipe, etc.) is provided in enclosure 112. Enclosure 112 may be a transparent tube or pipe that houses the target. A secondary reflector 116 is provided on an opposite side of enclosure 112 with respect to primary reflector 108. Secondary reflector 116 is configured to reflect light from lamp head 104 back to target 114 in enclosure 112 for irradiation (e.g., for curing a coating on target 114).

In accordance with the invention, it may be desired to provide a high and/or efficient (e.g., maximized) level of irradiation for a predetermined width at the location of target 114. That is, target 114 may have a narrow width. An example of such a target is a coated optical fiber, with a width on the order of 1 mm. In order to provide a desired level of irradiation at such a narrow target (and a corresponding efficient, or "green" use of such irradiation) it is desirable to direct the irradiation from lamp head 104 (reflected by primary reflector 108) in a narrow path toward the target. Thus, primary reflector 108 should be designed (taking in account factors such as the lamp head specifications, the positional relationship between the lamp head and the target, the position and emission characteristics of the LED sources, etc.) to provide a high level of irradiation at the target location, and having a desired width. For example, the desired width may be related to the target width (e.g., the desired width may be designed to be a multiple of the target width, etc.). Likewise, secondary reflector 116 should be designed to provide similar results (e.g., an efficient reflection of light received by secondary reflector 116 back to the target location at the desired width given the incident light rays from the lamp head 104 and primary reflector 108). Of note in FIG. 1 is that secondary reflector 116 (at least the interior reflective surface 116' of secondary reflector 116) has a shape defined by a compound curve.

The general layout of UV light curing system 100 in FIG. 1 may also be applied to systems 100a, 100b, and 500, as detailed below in the description of corresponding FIGS. 3, 4, and 5. That is, in FIGS. 3, 4, and 5—various elements have been omitted for simplicity including a power source, a light source (lamp head), and part of the primary reflector.

Figure 2:
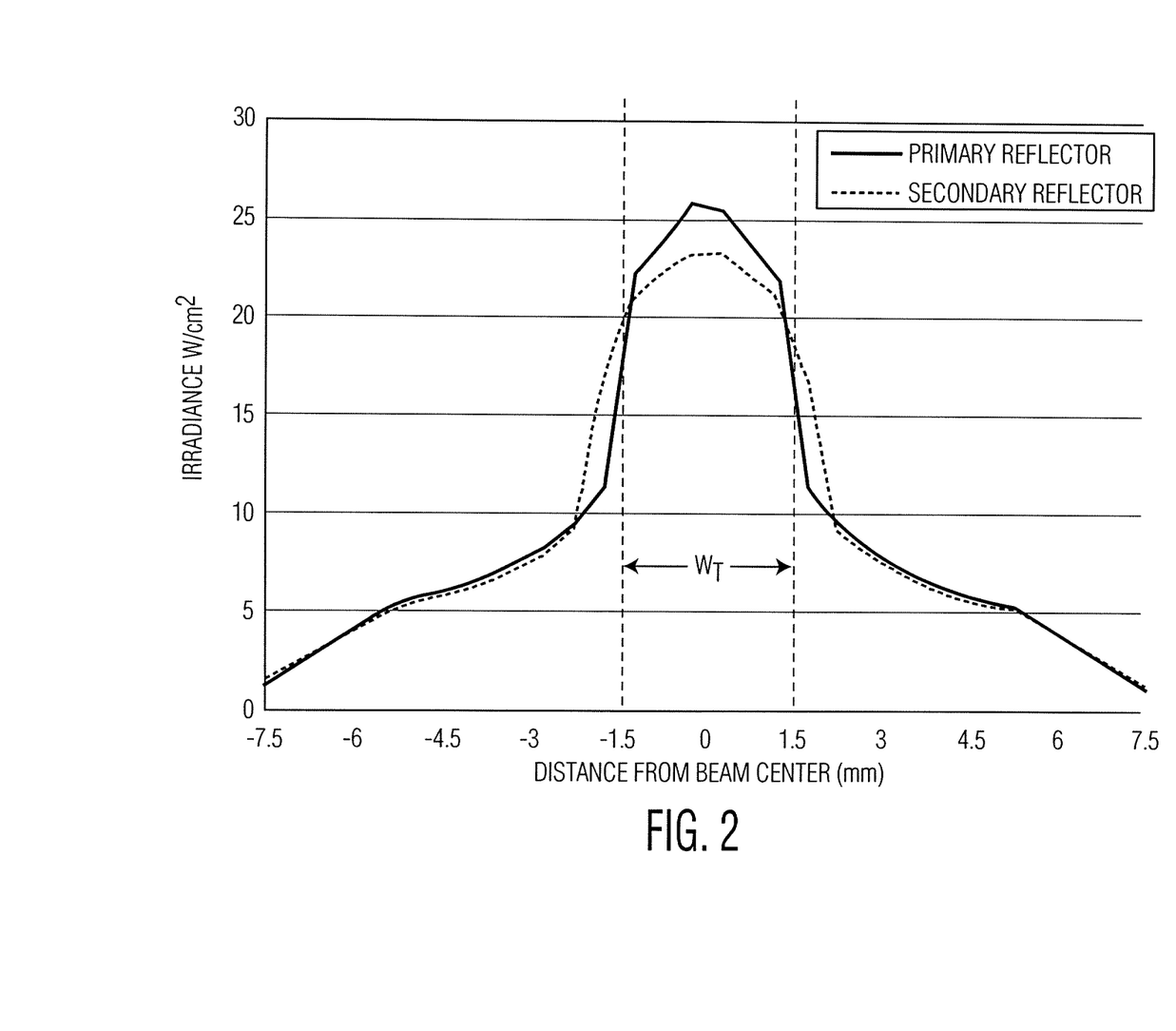
FIG. 2 is a graph illustrating irradiance versus beam width for a primary reflector and a secondary reflector in accordance with an exemplary embodiment of the invention.

In the design of the primary and secondary reflectors described above (and further described herein, for example, by reference to FIG. 6), it is desirable to confirm that the irradiance from each of the reflectors meets a desired level, and covers a desired width, at the target location. Referring to FIG. 2, a graphical illustration is provided showing the irradiance of a primary reflector and a secondary reflector in accordance with the invention. For example, assume that the target is a 1 mm optical fiber with a coating to be cured using a UV curing system in accordance with the invention. With such a narrow target, it may be desirable that the peak irradiance provided by each of the primary and secondary reflectors occupy a corresponding width at the target location. Such a corresponding width (for a 1 mm optical fiber) may be, for example, 1.5 mm, 2 mm, 2.5 mm, 3 mm, etc—with the beam center desirably centered on the midpoint of the optical fiber. For the same example, let us assume a target beam width ($W_T$ as shown in FIG. 2) of 3 mm (where the 3 mm spans from −1.5 to 1.5 on the x-axis).

Referring again to FIG. 2, the primary reflector has been designed to provide the highest levels of irradiance at the target location to have a target width of approximately 3 mm. That is, the irradiance curve is highest in the $W_T$ band. Likewise, the secondary reflector has been designed to provide the highest levels of irradiance at the target location to have a target width of approximately 3 mm. In such a design, the target should be desirably cured in an manner that efficiently uses the UV energy output from the UV light source (lamp head).

Figure 3:
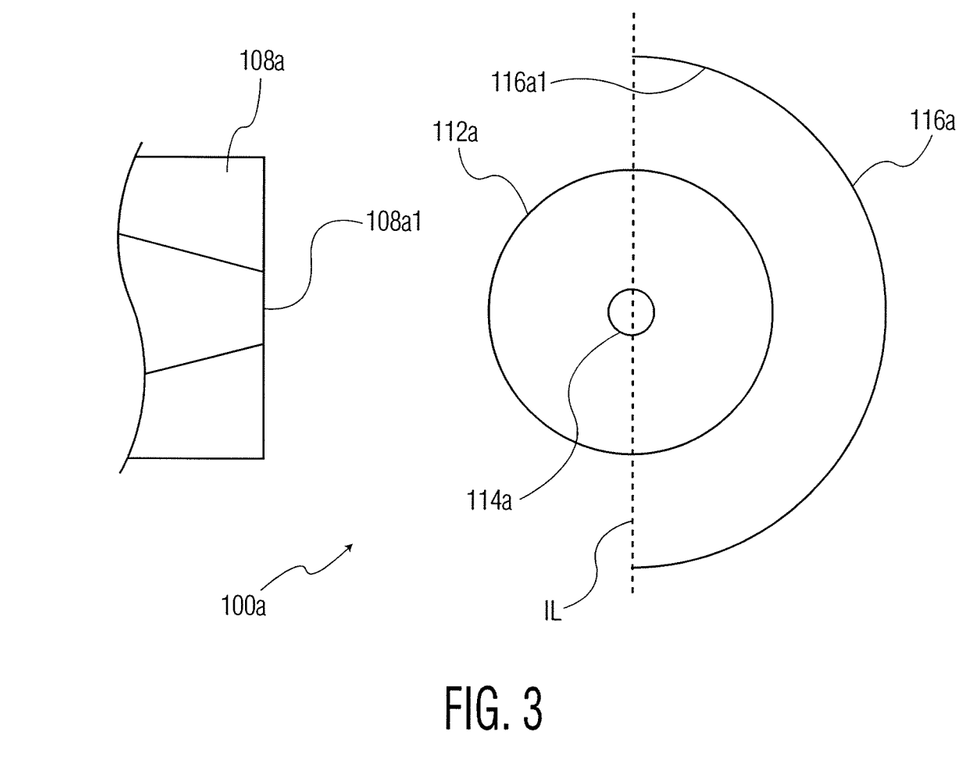
FIG. 3 is a block diagram of a portion of a UV light curing system in accordance with an exemplary embodiment of the invention.

FIG. 3 is a block diagram view of part of another UV curing system 100a. Opening 108a1 of primary reflector 108a reflects light emitted by the UV light source (not shown) in a direction of an enclosure 112a (e.g., a transparent tube, pipe, etc.). Enclosure 112a at least partially surrounds an object of interest to be irradiated (i.e., a target 114a). In the case of FIG. 3, the object of interest is an optical fiber 114a, and enclosure 112a surrounds optical fiber 114a at the portion of enclosure 112a being irradiated by the UV light source. A secondary reflector 116a (on an opposite side of enclosure 112a with respect to primary reflector 108a) is positioned along a portion of a length of enclosure 112a. The interior reflective surface 116a1 of secondary reflector 116a follows a curved path (which may be a compound curved path) extending from a first end to a second end as shown in FIG. 3. These ends are joined in FIG. 3 by an imaginary line "IL". A percentage by which secondary reflector 116a surrounds enclosure 112a at the relevant portion of the length of enclosure 112a may be determined by calculating the percentage of the area of enclosure 112a to the right of imaginary line "IL" in FIG. 3. According to an exemplary embodiment of the invention, such a percentage may be at least 40%, at least 50%, etc. In the example shown in FIG. 3, the percentage is approximately 50%.

Figure 4:
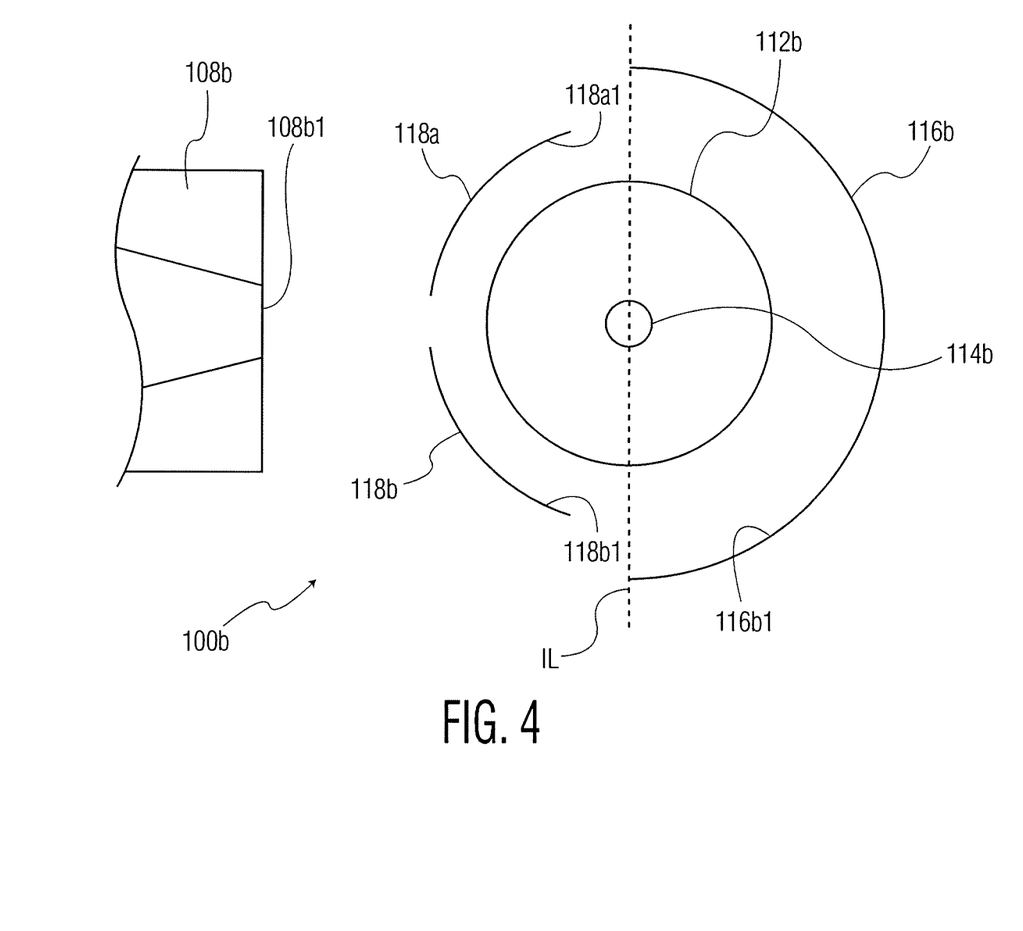
FIG. 4 is a block diagram of a portion of another UV light curing system in accordance with an exemplary embodiment of the invention.

FIG. 4 is a block diagram view of part of another UV curing system 100b, including various similar elements to those shown in FIG. 1 and FIG. 3. Opening 108b1 of primary reflector 108b reflects light emitted by the UV light source (not shown in FIG. 4) in a direction of an enclosure 112b, where enclosure 112b at least partially surrounds target 114b. Secondary reflector 116b (on an opposite side of enclosure 112b with respect to primary reflector 108b) is positioned along a portion of a length of enclosure 112b. The interior reflective surface 116b1 of secondary reflector 116b follows a curved path (which may be a compound curved path) extending from a first end to a second end as shown in FIG. 4, where these ends are joined in FIG. 4 by an imaginary line "IL". A percentage by which secondary reflector 116b surrounds enclosure 112a at the relevant portion of the length of enclosure 112b may be determined y calculating the percentage of the area of enclosure 112b to the right of imaginary line "IL" in FIG. 4. In the example shown in FIG. 4, the percentage is approximately 50%.

In accordance with various exemplary embodiments of the invention, in order to make the design of a UV curing system even more efficient, one or more tertiary reflectors may be provided between the primary reflector and the target (or the enclosure housing the target, if an enclosure is provided), where such a tertiary reflector reflects light from the secondary reflector back toward the target/enclosure. The tertiary reflector may mechanically be an extension of the primary reflector; that is, the tertiary reflector may be physically part of the primary reflector to simplify manufacturing or assembly.

UV light curing system 100b shown in FIG. 4 illustrates an example with two tertiary reflectors 118a and 118b. Some portion of the light reflected from interior surface 116b1 of secondary reflector 116b is received by the interior (reflective) surfaces 118a1, 118b1 of tertiary reflectors 118a, 118b, and is reflected back toward enclosure 112b (and target 114b). Thus, the percentage of the light transmitted by the light source (not shown in FIG. 4) that irradiates target 114b is increased, thereby increasing system efficiency. Of course, while two tertiary reflectors are shown in FIG. 4, any number of such tertiary reflectors may be provided as desired in a given application.

While the invention has been described largely with respect to individual light sources, individual primary reflectors, individual secondary reflectors (back reflectors), etc. for irradiating a length (portion) of a target, the teachings of the invention may be applied to a UV curing system including a plurality of one or more of the UV light source, the primary reflector, the secondary reflector, the tertiary reflectors, etc., as is desired in a given application. For example, such elements may be provided in groups along respective portions of the length of the enclosure. FIG. 5 is an example of such a configuration.

Figure 5:
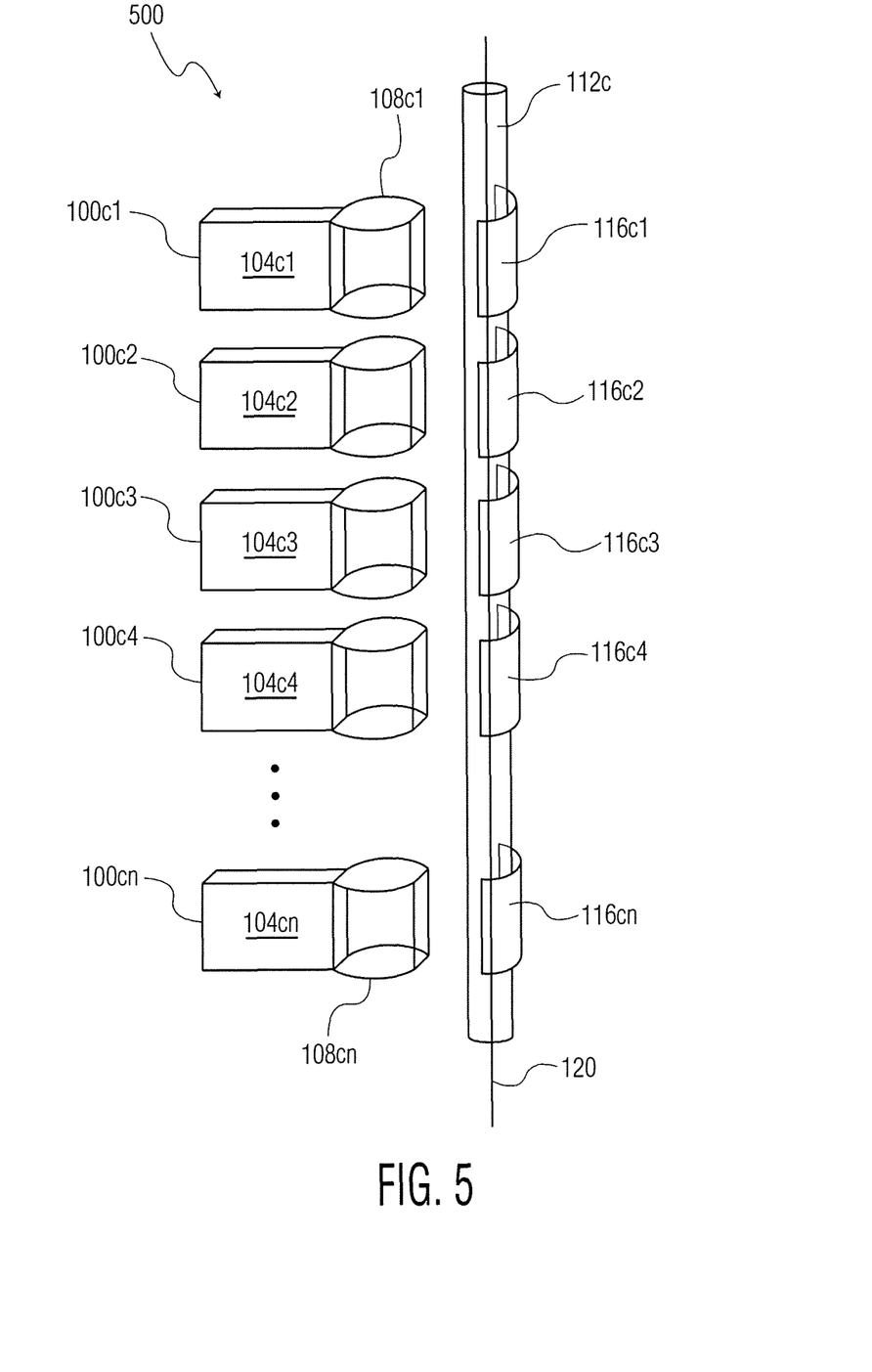
FIG. 5 is a block diagram of another UV light curing system, including a plurality of subsystems, in accordance with an exemplary embodiment of the invention.

FIG. 5 illustrates UV light curing system 500 configured for a curing operation. In the example shown in FIG. 5, the target is an optical fiber 120 in an enclosure (e.g., a transparent tube) 112c. For example, optical fiber 120 may include a coating (applied just prior to the intended irradiation shown in FIG. 5), where the coating is to be cured using UV light curing system 500. Optical fiber 120 may be moved through enclosure 112c on its way to a spool for respooling. As optical fiber 120 passes through UV curing system 500, the coating is cured.

UV curing system 500 includes a plurality of UV curing subsystems 100c1, 100c2, 100c3, 100c4, 100cn—each including elements such as those shown and described in connection with FIGS. 1, 3, and 4. For example, a subsystem 100c1 includes light source 104c1 (e.g., a lamp head including a plurality of UV LEDs), a primary reflector 108c1 for reflecting light toward enclosure 112c (and target optical fiber 120), and a secondary reflector 116c1. Secondary reflector 116c1 partially surrounds a portion of enclosure 112c (e.g., by at least 40%, by at least 50%, etc.). While no tertiary reflectors are shown in FIG. 5 (similar to tertiary reflectors 118a, 118b shown in FIG. 4), they are contemplated within the scope of the invention shown in FIG. 5.

Additional subsystems 100c2, 100c3, 100c4, 100cn include elements similar to those described above with respect to subsystem 100c1. Specifically: subsystem 100c2 includes light source 104c2, a primary reflector (not labelled), and a secondary reflector 116c2; subsystem 100c3 includes light source 104c3, a primary reflector (not labelled), and a secondary reflector 116c3; subsystem 100c4 includes light source 104c4, a primary reflector (not labelled), and a secondary reflector 116c4; and subsystem 100cn includes light source 104cn, a primary reflector 108cn, and a secondary reflector 116cn.

Figure 6:
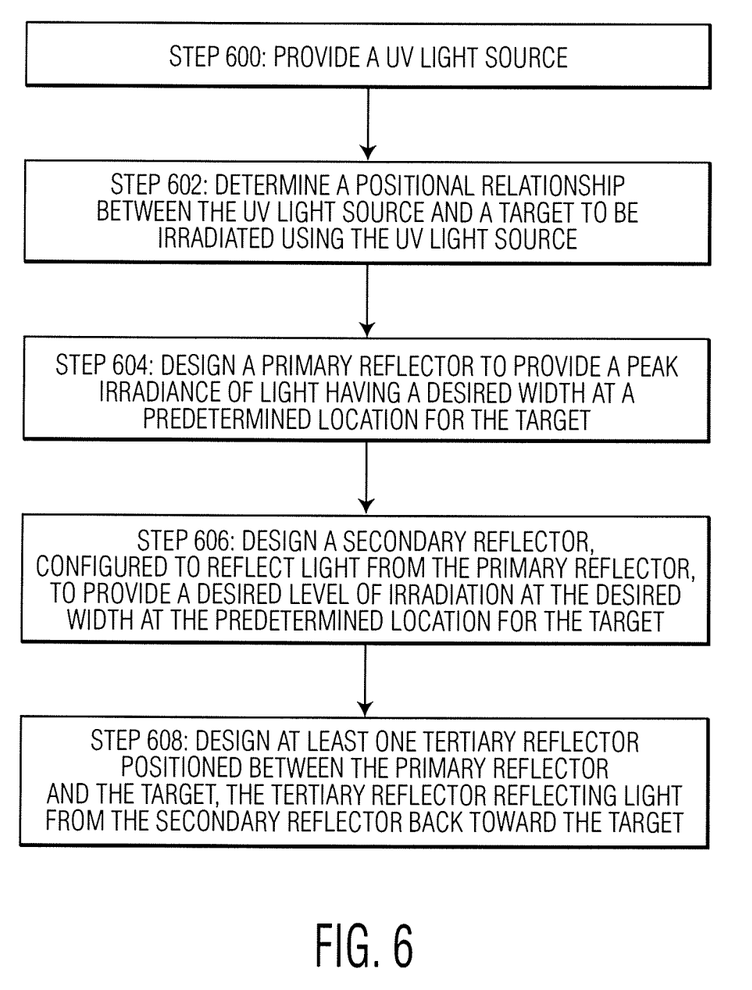
FIG. 6 is a flow diagram illustrating a method of designing a UV light curing system in accordance with an exemplary embodiment of the invention.

FIG. 6 is a flow diagram in accordance with certain exemplary embodiments of the invention. As is understood by those skilled in the art, certain steps included in the flow diagram may be omitted; certain additional steps may be added; and the order of the steps may be altered from the order illustrated.

Referring specifically to the flow diagram in FIG. 6, a method of designing a UV curing system is provided. At Step 600, a UV light source (e.g., lamp head 104 shown in FIG. 1) is provided. For example, the UV light source includes one or more light producing elements (e.g., UV LEDs). At Step 602, a positional relationship between the UV light source and a target (e.g., an optical fiber, a ribbon, a pipe, amongst others) to be irradiated using the UV light source is provided. Such a positional relationship may include distance information, orientation information, etc., and may be with respect to the target itself and/or the enclosure surrounding the target.

At Step 604, a primary reflector (e.g., primary reflectors 108, 108a, 108b, 108c1, 108cn, etc. illustrated in the various drawings) is designed, to provide a peak irradiance of light having a desired width at a predetermined location for the target (e.g., for a given UV light producing source size and distribution). That is, various factors are considered to design a primary reflector. Such factors include the specifications and physical geometry (e.g., LED layout) of the light source, the positional relationship referenced above, the desired width of the light beam used to irradiate the target, a desired level of irradiance at the predetermined location of the target and/or the enclosure, etc. Various techniques may be used in the designing of the primary reflector such as, for example, simulation software, irradiance testing at the predetermined location of example primary reflectors, amongst other techniques. As described above, FIG. 2 illustrates an example of an irradiance profile of a primary reflector (in the solid line)—where such irradiance profiling may be used in connection with the design of the primary reflector.

At Step 606, a secondary reflector (e.g., secondary reflectors 116, 116a, 116b, 116c1-116cn, etc. illustrated in the various drawings) is designed that is configured to reflect light from the primary reflector, where the secondary reflector is designed to provide a desired level of irradiation at the desired width at the predetermined location. At Step 608, at least one tertiary reflector (e.g., tertiary reflectors 118a, 118b, illustrated in FIG. 4) is designed, where the at least one tertiary reflector is positioned between the primary reflector and the target, and is designed to reflect light from the secondary reflector back toward the target at the predetermined location. Techniques for designing of the secondary reflector, and the tertiary reflectors, may be the same as those described herein in connection with the design of the primary reflector.

The method illustrated in FIG. 6 may also include a step of determining a location for each of a plurality of subsystems along a length of a target of the UV curing system (e.g., such as the target, and the corresponding subsystems, illustrated in FIG. 5). Each of the plurality of subsystems may include a respective UV light producing source, a respective one of the primary reflector designed in Step 604, a respective one of the secondary reflector designed in Step 606, and a respective tertiary reflector (or plurality of tertiary reflectors) as designed in Step 608.

Although the invention has particular applicability to narrow target applications (e.g., applications such as UV curing of coatings on optical fibers, where the light beam used to cure the coating is desirably narrow with a high level of irradiance), it is not limited thereto.

Although the invention is described primarily with respect to UV curing systems, the teachings herein may be applied to other types of light systems, and different types of applications other than UV curing applications.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A UV light curing system comprising:
   a UV light source including a plurality of UV LEDs for providing curing with respect to an object of interest;
   a primary reflector for reflecting light emitted by the UV light source in a direction of an enclosure, the enclosure at least partially surrounding the object of interest, the primary reflector being coupled to the UV light source;
   a secondary reflector on an opposite side of the enclosure with respect to the primary reflector, the secondary reflector being distinct from the enclosure, the secondary reflector being positioned along a portion of a length of the enclosure, the secondary reflector surrounding at least 40% of the enclosure at the portion of the length of the enclosure; and
   at least one tertiary reflector positioned between the primary reflector and the enclosure, the at least one tertiary reflector reflecting light from the secondary reflector back toward the enclosure.

2. The UV light curing system of claim 1 wherein the enclosure is a transparent tube, and the secondary reflector follows a curved path from a first end of the secondary reflector to a second end of the secondary reflector.

3. The UV light curing system of claim 2 wherein the secondary reflector surrounds at least 50% of the enclosure at the portion of the length of the enclosure.

4. The UV light curing system of claim 1 wherein a reflective surface of the secondary reflector has a shape defined by a compound curve.

5. The UV light curing system of claim 1, comprising a plurality of each of the UV light source, the primary reflector, and the secondary reflector, wherein the UV light curing system includes a plurality of subsystems provided along respective portions of the length of the enclosure, each of the plurality of subsystems includes a respective one of the UV light source, the primary reflector, and the secondary reflector.

6. A UV light curing system comprising:
   a UV light source including a plurality of UV LEDs for providing curing with respect to a target;
   a primary reflector for reflecting light emitted by the UV light source in a direction of the target, the primary reflector being coupled to the UV light source;
   a secondary reflector on an opposite side of the target with respect to the primary reflector, the secondary reflector being distinct from the target; and
   at least one tertiary reflector positioned between the primary reflector and the target, the tertiary reflector reflecting light from the secondary reflector back toward the target,
   wherein the target includes an optical fiber housed within a transparent tube.

7. The UV light curing system of claim 6 wherein the target includes an object of interest housed within a transparent tube, and the secondary reflector follows a curved path from a first end of the secondary reflector to a second end of the secondary reflector.

8. The UV light curing system of claim 7 wherein the secondary reflector surrounds at least 40% of the transparent tube at the portion of the length of the transparent tube.

9. The UV light curing system of claim 6 comprising a plurality of each of the UV light source, the primary reflector, the secondary reflector, and the at least one tertiary reflector, wherein a plurality of subsystems are provided along respective portions of a length of the target, each of the plurality of subsystems including a respective one of the UV light source, the primary reflector, the secondary reflector, and the at least one tertiary reflector.

10. The UV light curing system of claim 6 wherein a reflective surface of the secondary reflector has a shape defined by a compound curve.

11. The UV light curing system of claim 6 wherein a reflective surface of the at least one tertiary reflector has a shape defined by a compound curve.

12. A method of providing a UV light curing system, the method comprising the steps of:
   (a) designing a primary reflector to provide a desired irradiance of light at a predetermined target location for a UV light source including a plurality of UV LEDs, the primary reflector being configured to be coupled to the UV light source, the plurality of UV LEDs for providing curing with respect to a target at the predetermined target location;
   (b) designing a secondary reflector, configured to reflect light from the primary reflector, to provide an increase in the total irradiation at the predetermined target location, the secondary reflector being configured to be positioned on an opposite side of the target with respect to the primary reflector, the secondary reflector being distinct from the target, the secondary reflector being configured to be positioned along a portion of a length of the target;

(c) designing at least one tertiary reflector configured to be positioned between the primary reflector and the predetermined target location, the at least one tertiary reflector being configured to reflect light from the secondary reflector back toward the predetermined target location: and (d) providing the UV light curing system including (i) the UV light source, (ii) the primary reflector, (iii) the secondary reflector, and (iv) the at least one tertiary reflector in their designed configurations.

13. The method of claim 12 wherein step (b) includes the step of designing the secondary reflector to surround at least a portion of an enclosure enclosing the target at the predetermined target location, the secondary reflector following a curved path from a first end of the secondary reflector to a second end of the secondary reflector.

14. The method of claim 13 wherein the secondary reflector is configured to surround at least 40% of the enclosure at the portion of the length of the enclosure.

15. The method of claim 12 wherein step (b) includes the step of designing the secondary reflector to include a reflective surface having a shape defined by a compound curve.

16. The method of claim 12 wherein the method includes determining a location for each of a plurality of subsystems along a length of a target of the UV curing system, each of the plurality of subsystems including a respective one of the UV light source, a respective one of the primary reflector designed in step (a), and a respective one of the secondary reflector designed in step (b).

* * * * *